United States Patent Office 3,395,166
Patented July 30, 1968

3,395,166
THERMAL TRANSALKYLATION OF
TRIALKYL ALUMINUMS
Roger T. Johnson, Cary, N.C., assignor to Chevron Research Company, San Francisco, Calif., a corporation of Delaware
No Drawing. Continuation-in-part of application Ser. No. 311,665, Sept. 26, 1963. This application Sept. 7, 1967, Ser. No. 665,989
6 Claims. (Cl. 260—448)

ABSTRACT OF THE DISCLOSURE

Method for preparing olefins by continuously contacting a thin liquid film of a trialkyl aluminum in which the alkyl groups each contain 4 to 20 carbon atoms with a gaseous olefin of 2 to 4 carbon atoms at 250 to 320° C. and positive pressures up to 3 p.s.i.g. The steady state mol ratio of gaseous olefin to trialkyl aluminum is about 1:1 to 4:1, preferably it is approximately stoichiometric.

Cross reference to related applications

This application is a continuation-in-part of copending application Ser. No. 311,665, filed Sept. 26, 1963, and now abandoned.

Field of invention

This invention concerns a novel method for displacing alkyl groups from trialkyl aluminum with 1-olefins. More particularly, this invention concerns an improved process for transalkylating trialkyl aluminum with 1-olefins in a continuous manner.

Background of invention

A number of patents have issued disclosing the preparation of olefins of $C_4$ or greater by polymerizing ethylene with trialkyl aluminum (U.S. Patent Nos. 2,781,410; 2,889,385; 2,906,794; 2,957,898; 2,976,306; 3,014,941; 3,035,104; 3,066,162; 3,074,987; 3,076,047); followed by displacement of the alkyl groups with a different olefin, usually having fewer carbons than the alkyl groups of the trialkyl aluminum.

Initially, it was reported that the displacement reaction could be conveniently carried out by catalyzing, at relatively low temperatures, the cleavage of the trialkyl aluminum to an olefin and aluminum hydride and contacting the aluminum hydride with an olefin to reform the alkyl aluminum. The catalysts were such metals as nickel, cobalt or platinum. See U.S. Patent No. 2,781,410. However, the presence of these metals, particularly nickel, which found the most common usage, caused isomerization of the double bond, and interfered in subsequent steps in the process.

Subsequently, a particularly important discovery was that at elevated temperatures the alkyl groups could be displaced from an atomized spray or vapor of trialkyl aluminums with gaseous olefin. See, for example, Brennstoff Chemie, 72 321 No. 22, Nov. 21, 1960, and U.S. Patent Nos. 3,014,941; 3,180,881 and 3,210,435. In such vapor systems it was necessary to have large recirculating streams of displacing olefin. Otherwise, residence times increase or the spray coalesces resulting in alkyl decomposition. Consequently, these atom or spray processes suggest using large olefin:trialkyl aluminum mol ratios.

Invention description

It has now been found that a continuous thermal transalkylation can be readily carried out by concurrently introducing into a reaction zone at a surface temperature in the range of about 250° to 320° C. a liquid film of trialkyl aluminum, wherein the individual alkyl groups are predominantly of at least 4 carbon atoms or greater, with a gaseous displacing olefin; then isolating the materials boiling below 250° to 320° C., i.e., olefin product and alkyl aluminum displacement product, as volatiles, which can be condensed by any convenient means, and removing the materials boiling above 250° to 320° C. (unreacted trialkyl aluminum feed and $\sim C_{18}$ or higher side reaction products) as bottoms.

The film can be obtained by any convenient means. The film may be formed by introducing the film on a wall, either distributed as a falling film or formed by a wiper blade, or by using a rotating element, such as a revolving cylindrical vessel, or by any other means known in the art. The film will usually be about ½ mm. in depth and can be as thick as 2 or 3 mm., but will generally be about 1 mm.

The trialkyl aluminum can be introduced neat or diluted with inert materials, usually hydrocarbons. Preferably, the trialkyl aluminum is introduced into the reaction zone in the absence of inert diluents, but both saturated aliphatic and olefinic hydrocarbons may be present.

The alkyl groups of the trialkyl aluminum will usually each contain 4 to 20 carbon atoms, preferably peaking in the range of about 8 to 14 carbon atoms. That is, about 60% by weight of olefin yield will be in the 8 to 14 carbon atom range. The alkyl groups can be straight-chain or branched, but are preferably straight-chain and are prepared by polymerizing ethylene.

The trialkyl aluminum compounds can be prepared in a variety of ways, but are usually prepared by polymerizing ethylene with a tri(lower alkyl) aluminum. The growth process is described in numerous patents. See, for example, U.S. Patent Nos. 2,699,457; 2,781,410; 2,826,-598; 2,889,385; and 3,066,162.

The displacing olefin will generally contain 2 to 4 carbon atoms. Such olefins include ethylene, propylene and 1-butene. Ethylene is preferred.

The amount of olefin initially charged to the reaction zone will depend upon the size of the reaction zone, temperature and pressure. Thus, the initial amount of gaseous olefin charged to the reactor may be greatly in excess of the initial amount of trialkyl aluminum. However, when steady-state is achieved the feed mol ratio of olefin to trialkyl aluminum will usually be close to stoichiometric, i.e., in the range of about 1:1 to about 4:1, preferably approximating 3:1. These low steady-state ratios are possible because the invention process gives high conversions without significant dimerization, double bond isomerization or alkyl decomposition. Correlatively, only enough gaseous olefin to replace that consumed is essential. No recirculation is required. Under these conditions a slight positive pressure is kept on the system so that displacing gaseous olefin is fed continuously to the reaction zone. The positive pressure can be anywhere from a few inches of mercury, i.e., 1 or 2 inches, to about 8 p.s.i.g., preferably from about 3–6 p.s.i.g. High steady-state olefin:trialkyl aluminum mol ratios may give pressures in excess of about 8 p.s.i.g. These should be avoided since they reduce the volatility of the olefins and the trialkyl aluminum formed with the displacing olefin.

The contact time is inherent in the system, since the trialkyl aluminum and olefin product will vaporize upon being displaced. Usually, the contact time will be less than a few seconds, generally in the range of about .1 to 1.0 second.

EXAMPLES

The following examples are offered by way of illustration and not by way of limitation.

The apparatus is a closed vertical cylinder with the necessary inlets and outlets at the top and bottom. At the top are inlets for the trialkyl aluminum and displacing olefin, with means for maintaining a positive pressure. It may be advantageous to provide a bleed to remove inert vapors which may accumulate at the top of the vessel. The cylinder is surrounded by a heating element equipped with temperature controlling means. A rod is rotatably fitted through the top of the cylinder to which are attached a plurality of wiper blades, the blades contacting the inner surface of the cylinder, and are situated to permit a film of the desired thickness. The rod is turned by a motor at a convenient rate.

The bottom of the cylinder has a center well, with a surrounding raised lip. Extending almost the entire length of the reactor is a condenser. The outer ring of the bottom has an outlet for removing non-volatile products and unreacted trialkyl aluminum while the well has an outlet for the condensed olefin and tri(lower)alkyl aluminum products. Except for the bleed, the gaseous olefin feed leaves such a reactor only as tri(lower) alkyl aluminum product and non-volatile products in the bottoms. The steady-state olefin:trialkyl aluminum feed mol ratio in all the following examples was approximately stoichiometric.

EXAMPLE 1

A typical growth product having an average carbon number of 8 was fed into the displacer with ethylene maintained at 3 p.s.i.g. The average wall temperature was approximately 275° C. The reaction was carried out for 30 minutes. Sixty-four percent of the product was contained in the overhead. The conversion to triethyl aluminum was aproximately 75%. Of the 1-olefins formed, approximately 75% were in the overhead, while of the total triethyl aluminum formed, aproximately 67% was in the overhead. The overall trialkyl aluminum recovery was 98%.

EXAMPLE 2

Using the apparatus described above, commercial tridecyl aluminum was displaced with ethylene at 5 p.s.i.g. and with an average wall temperature of about 275° C. The conversion was 93% complete with 93% of the decene-1 formed and 79% of the triethyl aluminum formed being taken overhead.

The following table provides the results from a number of runs carried out as described in Example 2.

TABLE I

| | | | | | |
|---|---|---|---|---|---|
| Temperature, °C.[1] | 280 | 250 | 255 | 295 | [4] 300 |
| Pressure, atmospheric plus inches Hg | 2 | 2 | 2 | 2 | 4 |
| Displacing Olefins | $C_2$ | $C_2$ | $C_4$ | $C_2$ | $C_2$ |
| Flow rate, gms./min | .8 | .7 | .6 | .7 | .5 |
| Percent Al($C_{10}$)$_3$ Conversion [2] | 98 | 83 | 62 | 99 | 83 |
| Percent Recovered [3] | 80 | ------ | 100 | 85 | 100 |
| Percent of total decene±1 in overhead | 94 | 88 | 93 | 98.5 | 85 |
| Percent of total triethyl aluminum in overhead | 90 | 69 | 5.8 | 90.5 | 57 |

[1] Average outside wall temperature ±15° C.
[2] Percent conversion of Al($C_{10}$)$_3$ to Al($C_D$)$_3$; $C_D$ is the displacing olefin.
[3] Weight percent recovered allowing for 2.0 g. holdup in the equipment.
[4] Outside wall consisted of a narrow heating zone followed by a cooling zone.

The olefin products in the range of 10 to 16 carbon atoms are particularly useful in the preparation of detergents and by means of this invention the olefins which are of longer chain length are separated simultaneously with the transalkylation. By using lower olefins, i.e., 2 to 4 carbon atoms, as displacing olefins, excellent yields are obtained with the trialkyl aluminum formed rapidly volatilizing, being condensed on the condensing surface and removed from the reaction zone.

As will be evident to those skilled in the art, various modifications on this process can be made or followed in the light of the foregoing disclosure and discussion, without departing from the spirit or scope of the disclosure or from the scope of the following claims.

I claim:

1. A method for transalkylating trialkyl aluminum, wherein said alkyl groups each contain 4 to 20 carbon atoms, which comprises continuously introducing into a reaction zone said trialkyl aluminum as a liquid film in the presence of gaseous olefins of 2 to 4 carbon atoms, the steady-state olefin:trialkyl aluminum feed mol ratio being in the range of about 1:1 and about 4:1, at about 250° to 320° C., and a positive pressure of up to about 8 p.s.i.g. for a time sufficient to provide displacement of the alkyl groups with said gaseous olefins and isolating the volatile reaction products as one fraction and the non-volatile reaction products and unreacted trialkyl aluminum as a second fraction.

2. The method according to claim 1, wherein the pressure is about 3 to 6 p.s.i.g.

3. The method according to claim 1, wherein the gaseous olefin is ethylene.

4. The method according to claim 1, wherein the steady-state olefin:trialkyl aluminum feed mol ratio is approximately stoichiometric.

5. The method according to claim 1, wherein the liquid film is ½ to 3 mm. thick.

6. The method according to claim 1 wherein the liquid film is about 1 mm. thick.

References Cited

UNITED STATES PATENTS 3,210,435  10/1965  Kennedy et al.
3,278,633  10/1966  Serratore et al.

TOBIAS E. LEVOW, *Primary Examiner.*

H. M. S. SNEED, *Assistant Examiner.*